(12) United States Patent
Yanagi

(10) Patent No.: US 9,834,658 B2
(45) Date of Patent: Dec. 5, 2017

(54) RUBBER COMPOSITION AND TIRE OBTAINED USING SAME

(71) Applicant: BRIDGESTONE CORPORATION, Tokyo (JP)

(72) Inventor: Hideshi Yanagi, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/306,900

(22) PCT Filed: Apr. 30, 2015

(86) PCT No.: PCT/JP2015/063025
§ 371 (c)(1),
(2) Date: Oct. 26, 2016

(87) PCT Pub. No.: WO2015/170669
PCT Pub. Date: Nov. 12, 2015

(65) Prior Publication Data
US 2017/0044347 A1   Feb. 16, 2017

(30) Foreign Application Priority Data

May 8, 2014 (JP) .................................. 2014-097198

(51) Int. Cl.
| | |
|---|---|
| *C08K 3/00* | (2006.01) |
| *C08K 3/04* | (2006.01) |
| *C08J 3/22* | (2006.01) |
| *C08K 9/00* | (2006.01) |
| *B60C 1/00* | (2006.01) |

(52) U.S. Cl.
CPC .................. *C08K 3/04* (2013.01); *B60C 1/00* (2013.01); *C08J 3/22* (2013.01); *C08K 9/00* (2013.01); *C08J 2307/02* (2013.01); *C08K 2201/006* (2013.01); *Y02T 10/862* (2013.01)

(58) Field of Classification Search
CPC ...... C08K 3/04; C08K 9/00; C08J 3/22; C08J 2307/02
See application file for complete search history.

(56) References Cited

U.S. PATENT DOCUMENTS

| | | | |
|---|---|---|---|
| 9,045,583 B2* | 6/2015 | Ishibashi | ................ C08G 18/83 |
| 2003/0195276 A1* | 10/2003 | Mabry | .................. B01F 5/0256 |
| | | | 523/334 |
| 2010/0144951 A1 | 6/2010 | Yamada et al. | |
| 2010/0311898 A1 | 12/2010 | Yamada et al. | |
| 2012/0172517 A1 | 7/2012 | Zhang et al. | |

FOREIGN PATENT DOCUMENTS

| | | |
|---|---|---|
| JP | 2006-213804 A | 8/2006 |
| JP | 2009-041026 A | 2/2009 |
| JP | 2009-126978 A | 6/2009 |
| JP | 2011-57967 A | 3/2011 |
| JP | 2013-505323 A | 2/2013 |
| WO | 99/16600 A1 | 4/1999 |
| WO | 2009/072413 A1 | 6/2009 |
| WO | 2010/055919 A1 | 5/2010 |
| WO | 2010/143633 A1 | 12/2010 |

OTHER PUBLICATIONS

International Search Report for PCT/JP2015/063025 dated Jul. 28, 2015.
Communication dated Mar. 27, 2017 from the European Patent Office in counterpart Application No. 15789127.6.

* cited by examiner

Primary Examiner — Hannah Pak
(74) Attorney, Agent, or Firm — Sughrue Mion, PLLC

(57) ABSTRACT

The present invention provides: a rubber composition obtained by mixing 30 to 80 parts by mass of carbon black, whose DBP absorption value and CTAB adsorption specific surface area satisfy the following relational formulas (I) and (II), into 100 parts by mass of a rubber component, wherein macrodispersion D(%) of the carbon black in the rubber composition is 1% or more and less than 10%, and the rubber composition has high performance and excellent processability such as roll workability and the like; and a rubber product such as a tire having reduced rolling resistance and excellent fatigue resistance and abrasion resistance.

$$\text{DBP absorption value}(cm^3/100\ g) < 3.0 \times (\text{CTAB adsorption specific surface area}(m^2/g)) - 270 \qquad (I)$$

$$\text{DBP absorption value}(cm^3/100\ g) < 115 \qquad (II)$$

$$\text{CTAB adsorption specific surface area}(m^2/g) < 230 \qquad (III).$$

5 Claims, No Drawings

RUBBER COMPOSITION AND TIRE OBTAINED USING SAME

CROSS REFERENCE TO RELATED APPLICATIONS

This application is a National Stage of International Application No. PCT/JP2015/063025 filed Apr. 30, 2015, claiming priority based on Japanese Patent Application No. 2014-097198 filed May 8, 2014, the contents of all of which are incorporated herein by reference in their entirety.

TECHNICAL FIELD

The present invention relates to a rubber composition, more specifically to a rubber composition having excellent processability.

BACKGROUND ART

In the rubber industry, when producing a rubber composition containing filler such as carbon black and the like, it is known to use a wet masterbatch in order to improve processability of the rubber composition and dispersibility of the filler.

By producing a rubber composition by using the wet masterbatch, there is obtained a rubber composition having better dipersibility of the filler and better rubber physical properties such as fatigue resistance, reinforcing property, and the like compared to a conventional rubber composition obtained by mixing in a solid phase.

Further, by using such a rubber composition as a raw material, there can be produced rubber products such as tire and the like having, for example, reduced rolling resistance, and excellent fatigue resistance and abrasion resistance.

Such a rubber wet masterbatch is obtained in the following manner.

First, filler-containing slurry is obtained by mixing beforehand the filler and a dispersion solvent in a certain proportion and dispersing the filler in the dispersion solvent by a mechanical force. Subsequently, the filler-containing slurry and a rubber latex are mixed in a liquid phase, followed by addition of a coagulating agent such as an acid and the like to coagulate the mixture, and the coagulated material is recovered and dried to obtain a rubber wet masterbatch.

Furthermore, as another method, there has been proposed a method of producing an elastomer composite, which is strongly bound without using a coagulating agent including acids and salts, by feeding a fast flowing particulate filler and a slow flowing elastomer latex to a mixing zone of a coagulated rubber reaction vessel, and mixing and coagulating the mixture under a state of a high shear flow and a turbulence flow generated in the mixing zone (see Patent Literature 1).

CITATION LIST

Patent Literature

PTL1: Japanese Patent Laid-Open No. 2009-41026

SUMMARY OF INVENTION

Technical Problem

Even though the elastomer composite described in the Patent Literature 1 has an effect that macrodispersion of fine particulate filler therein is particularly excellent, it has become clear that, in such an elastomer having the filler highly dispersed, a problem exists that processability such as, for example, roll workability and the like becomes significantly deteriorated.

That is, it has turned out that, when dispersion of the filler in the elastomer progresses and a total area of aggregates having a diameter larger than 10 μm is less than 1.0%, there arises a problem that a surface area between the filler and a polymer extremely increases to cause a viscosity increase of the elastomer mixture, resulting in substantial deterioration of roll workability and kneading workability.

On the other hand, it has turned out that, when dispersion of the filler in the elastomer is worsened and the total area of aggregates having a diameter larger than 10 μm is 10% or more, deterioration of a reinforcing property occurs and, especially, a fatigue resistant life is extremely shortened.

Therefore, the present invention aims to clarify an effect of dispersibility of filler in a rubber composition (elastomer) on rubber physical properties and workability, and to provide a rubber composition (elastomer mixture) having high performance and excellent processability, and a tire using the rubber composition.

Solution to Problem

The present inventors conducted diligent research in order to solve the above problems and, as a result, discovered that a rubber composition (elastomer mixture) having high performance and excellent processability can be obtained by mixing a specific amount of carbon black having specific physical properties into a rubber component.

The present invention was completed based on such a finding.

That is, the present invention provides:

[1] A rubber composition obtained by mixing 30 to 80 parts by mass of carbon black, whose DBP absorption value and CTAB adsorption specific surface area satisfy the following relational formulas (I) to (III), into 100 parts by mass of a rubber component, wherein macrodispersion D (%) of carbon black in the rubber composition is 1% or more and less than 10%:

$$DBP \text{ absorption value}(cm^3/100 \text{ g}) < 3.0 \times (CTAB \text{ adsorption specific surface area}(m^2/g)) - 270 \quad (I);$$

$$DBP \text{ absorption value}(cm^3/100 \text{ g}) < 115 \quad (II); \text{ and}$$

$$CTAB \text{ adsorption specific surface area}(m^2/g) < 230 \quad (III), \text{ and}$$

[2] A tire obtained by using the rubber composition according to above [1].

Advantageous Effects of Invention

According to the present invention, there is provided a rubber composition (elastomer mixture) having high performance and excellent processability such as a roll working property and the like, and by using such a rubber composition, there can be produced rubber products such as a tire and the like having reduced rolling resistance, and excellent fatigue resistance and abrasion resistance.

DESCRIPTION OF EMBODIMENTS

The rubber composition of the present invention is a rubber composition obtained by mixing 30 to 80 parts by mass of carbon black into 100 parts by mass of a rubber component. The amount of carbon black to be mixed is more preferably 40 to 70 parts by mass.

[Rubber Component]

The rubber component in the present invention is not particularly limited and there can be mentioned usual natural rubber and diene-based synthetic rubber. As the diene-based synthetic rubber, there may be mentioned, for example, a styrene-butadiene copolymer (SBR), polybutadiene (BR), polyisoprene (IR), butyl rubber (IIR), and an ethylene-propylene copolymer, a mixture of these, and the like.

[Carbon Black]

The carbon black used in the present invention has a DBP absorption value and a CTAB adsorption specific surface area which satisfy the following formulas (I) to (III), and is characterized in that macrodispersion D (%) of the carbon black in the rubber composition is 1% or more and less than 10%:

$$DBP \text{ absorption value}(cm^3/100 \text{ g}) < 3.0 \times (CTAB \text{ adsorption specific surface area}(m^2/g)) - 270 \quad (I);$$

$$DBP \text{ absorption value}(cm^3/100 \text{ g}) < 115 \quad (II); \text{ and}$$

$$CTAB \text{ adsorption specific surface area}(m^2/g) < 230 \quad (III)$$

(DBP Absorption Value)

The term DBP is an abbreviation for dibutyl phthalate and the DBP absorption value is a volume ($cm^3$/100 g) of dibutyl phthalate (DBP) absorbed by 100 g of carbon black, as measured in accordance with JIS K6217-4:2001.

(CTAB Adsorption Specific Surface Area)

The term CTAB is an abbreviation for cetyltrimethylammonium bromide. Generally, a nitrogen adsorption method is used for measurement of a specific surface area of carbon black. However, some types of carbon black have, over a wide portion of a total surface area, pores having a diameter of about several angstroms into which rubber cannot infiltrate. Therefore, evaluation of pores into which rubber can infiltrate is carried out by using a large molecule to be adsorbed and, as the molecule to be adsorbed, there is used CTAB.

The CTAB adsorption specific surface area is measured in accordance with ISO 6810, and evaluates a specific surface area ($m^2$/g) of pores of carbon black into which rubber can infiltrate.

By using carbon black which satisfies the above formulas (I) to (III) as the carbon black, there can be obtained an effect of the present invention, that is, a rubber composition having high performance and excellent processability.

Further, the carbon black used in the present invention preferably satisfies the following formula (I'):

$$3.0 \times CTAB \text{ adsorption specific surface area}(m^2/g) - 710 < DBP \text{ absorption value}(cm^3/100 \text{ g}) < 3.0 \times CTAB \text{ adsorption specific surface area}(m^2/g) - 270 \quad (I')$$

Also, the carbon black preferably satisfies the following formula - - - (II'):

$$40 < DBP \text{ absorption value}(cm^3/100 \text{ g}) < 115 \quad (II')$$

Furthermore, it is especially preferable that, from a viewpoint of performance and processability, the carbon black satisfies both of the above formulas (I') and (II').

In addition, it is essential that macrodispersion D (%) of carbon black in the rubber composition of the present invention is 1% or more and less than 10%.

Here, the macrodispersion D refers to an index which shows dispersibility of aggregates of carbon black in the rubber composition, and is measured and calculated by the following method.

(Method for Calculating Macrodispersion D)

This is evaluated by using an image analysis of a cut surface sample in an unvulcanized rubber composition. In the present application, when carrying out an image analysis, four arbitrarily selected optical images are gathered from the cut surface. Surface defects having a size larger than 10 μm are measured according to an image analysis procedure, a total defect area per an inspection unit area is obtained, and an undispersed area % calculated by the following formula corresponds to the macrodispersion D.

$$\text{Undispersed area } \% = \frac{1}{Am} \sum_{i=1}^{m} Ni \frac{\prod Di^2}{4} \quad \text{[Math 1]}$$

Here, each symbol has the following meaning:
Am: surface area of all samples inspected,
Ni: number of defects having a size of Di,
Di: a diameter of a circle having the same area as that of the defect (equivalent circle diameter), and
m: number of images.

When the macrodispersion D is less than 1%, there occur flaws in processability such as roll workability and the like. On the other hand, when the macrodispersion D is 10% or more, there occur flaws in performance such as fatigue resistance, abrasion resistance, and the like.

From the above viewpoint, it is more preferable that the macrodispersion D is 1% or more and less than 8%.

It is more preferable that the carbon black has an average amount of surface acidic functional groups ($\mu eq/m^2$), which satisfies the following formula (IV):

$$0.15 \leq \text{average amount of surface acidic functional groups} < 3.00 \quad (IV)$$

Further, the average amount of surface acidic functional groups of the carbon black is, from a viewpoint of fining of a particle size distribution of a slurry solution and preventing deterioration of the reinforcing property, more preferably 0.20 or more and 2.00 or less, and even more preferably 0.3 or more and 1.5 or less.

As a means for quantifying the amount of acidic functional groups, there may be mentioned, for example, the following method proposed by Boehm and others.

<Method of Boehm and Others>

In a flask, 10 g of carbon black and 50 g of a 0.01 mol/L aqueous $C_2H_5ONa$ solution are stirred for 2 hours, and thereafter the mixture is allowed to stand at room temperature for 22 hours. After standing, the mixture is stirred for further 30 minutes, and thereafter filtered to recover a filtrate. The recovered filtrate (25 mL) is neutralization titrated with a 0.01 mol/L aqueous HCl solution, and an amount (mL) of the aqueous HCl solution required for the pH to reach 4.0 is measured. From the amount of the aqueous HCl solution and the following formula (V), the amount of acidic functional groups (meq/kg) is calculated:

$$\text{Amount of acidic functional groups} = (25 - (\text{amount of aqueous HCl solution})) \times 2 \quad (V)$$

The average amount of surface acidic functional groups is a value obtained by dividing the amount of acidic functional groups measured by the above method by a nitrogen adsorption specific surface area of the carbon black, and is represented in terms of equivalents per unit area ($\mu eq/m^2$).

(Nitrogen Adsorption Specific Surface Area)

The nitrogen adsorption specific surface area is measured in accordance with JIS K 6217(1997).

The type of carbon black is not limited as long as it has the above-mentioned properties, and there can be used those which are commonly used in the rubber industry. There may be used various grades of carbon black such as, for example, SAF, HAF, ISAF, FEF, GPF, and the like singly or as a mixture.

The carbon black used in the present invention is obtained by an oil furnace method, which is a publicly known production method as shown in a publication, "Carbon Black Handbook (Third Edition)" (Carbon Black Association Ed., published in 1995).

(Chemicals for Rubber)

In the rubber composition of the present invention, there can be applied generally used rubber chemicals in a range that the effect of the present invention is exhibited. For example, there can be used an antioxidant, wax, stearic acid, a resin, process oil, zinc oxide, and the like.

As the antioxidant, there may be mentioned antioxidants such as, for example, an amine-based one, a quinoline-based one, a phenol-based one, an organic phosphite-based one, a thioether-based one, or the like.

The wax, which is also called a sunlight crack prevention agent, has an effect of suppressing cracks in rubber generated by an action of sunlight or ozone. That is, the wax exhibits its effect by blooming out on the surface of the rubber after vulcanization, shutting off the rubber surface from air, and reflecting sunlight.

The stearic acid is an activator for an acidic vulcanization accelerator which is used for natural rubber, synthetic rubber, latex, and the like and, for a basic vulcanization accelerator, it has an effect of suppressing early vulcanization. Further, the stearic acid is effective as a softener and, especially when a large amount of a mixing agent such as carbon black is used, the stearic acid works as a dispersant to improve dispersion thereof.

As the resin, there can be used a phenol resin, an alicyclic hydrocarbon resin, and the like. These are used for purposes of making rubber more elastic, improving viscoelasticity of rubber, and the like.

As the process oil, there may be mentioned aromatic process oil, naphthenic oil containing asphalt, and the like. Preferable is process oil in which a content of polycyclic aromatic compound (PCA), denoted as an extract with dimethyl sulfoxide (DMSO) in the process oil according to the IP 346 method, is less than 3% by mass.

The rubber composition of the invention preferably comprises a rubber composition produced by using a wet masterbatch which is produced by drying a mixture obtained by mixing a slurry, formed by dispersing the aforementioned carbon black in water, and rubber latex in a liquid phase.

In the rubber composition of the present invention, it is preferable that a rubber component in the above wet masterbatch is contained in an amount of 20% by mass or more relative to a total of the rubber components. As other rubber components used in addition to the wet masterbatch, there may be mentioned usual natural rubber and diene-based synthetic rubber. As the diene-based synthetic rubber, there may be mentioned those mentioned previously, a mixture of these, and the like.

(Rubber Latex)

As the rubber latex used in the wet masterbatch of the present invention, there may be mentioned natural rubber latex and/or synthetic rubber latex.

As the natural rubber latex, there can be used any of field latex, ammonia-treated latex, centrifugally separated and concentrated latex, deproteinized latex treated with an enzyme, a combination of the above latex, and the like.

As the synthetic rubber latex, there can be used, for example, latex of styrene-butadiene copolymer rubber, nitrile rubber, polychloroprene rubber, or the like.

A rubber concentration in the rubber latex is usually 5 to 70% by mass, and preferably 15 to 40% by mass. In addition, the rubber latex may be used by diluting with water and the like.

(Filler Slurry)

The filler slurry which can be used for the wet masterbatch of the present invention is one containing the carbon black having the aforementioned properties as an essential component, but may additionally contain silica and inorganic filler represented by the following general formula (VI):

$$n\text{M}.x\text{SiO}_y.z\text{H}_2\text{O} \qquad (VI)$$

(in the formula, M is a metal selected from aluminum, magnesium, titanium, calcium, and zirconium, or at least one selected from oxides or hydroxides of these metals, hydrates thereof, and carbonates of the metals; and n, x, y and z are respectively an integer of 1 to 5, an integer of 0 to 10, an integer of 2 to 5, and an integer of 0 to 10).

The aforementioned silica is not particularly limited, and suitably used are silica by a wet method, silica by a dry method, and colloidal silica. The aforementioned filler may be used singly or as a mixture.

As the inorganic filler represented by the general formula (VI), there can specifically be used alumina ($Al_2O_3$) such as γ-alumina, α-alumina, and the like; alumina monohydrate ($Al_2O_3.H_2O$) such as boehmite, diaspore, and the like; aluminum hydroxide ($Al(OH)_3$) such as gibbsite, bayerite, and the like; aluminum carbonate ($Al_2(CO_3)_2$), magnesium hydroxide ($Mg(OH)_2$), magnesium oxide (MgO), magnesium carbonate ($MgCO_3$), talc ($3MgO.4SiO_2.H_2O$), attapulgite ($5MgO.8SiO_2.9H_2O$), titanium white ($TiO_2$), titanium black ($TiO_{2n-1}$), calcium oxide (CaO), calcium hydroxide [$Ca(OH)_2$], magnesium aluminum oxide ($MgO.Al_2O_3$), clay ($Al_2O_3.2SiO_2$), kaolin ($Al_2O_3.2SiO_2.2H_2O$), pyrophyllite ($Al_2O_3.4SiO_2.H_2O$), bentonite ($Al_2O_3.4SiO_2.2H_2O$), aluminum silicate ($Al_2SiO_5$, $Al_4.3SiO_4.5H_2O$, and the like), magnesium silicate ($Mg_2SiO_4$, $MgSiO_3$, and the like), calcium silicate ($Ca_2.SiO_4$ and the like), aluminum calcium silicate ($Al_2O_3.CaO.2SiO_2$ and the like), calcium magnesium silicate ($CaMgSiO_4$), calcium carbonate ($CaCO_3$), zirconium oxide ($ZrO_2$), zirconium hydroxide ($ZrO(OH)_2.nH_2O$), zirconium carbonate ($Zr(CO_3)_2$); and crystalline aluminosilicates such as various zeolites containing hydrogen, alkali metals, or alkaline earth metals which balance the electric charge.

Further, as the inorganic filler represented by the general formula (VI), preferable is one in which M is at least one selected from an aluminum metal, an oxide or hydroxide of aluminum, a hydrate thereof, and a carbonate of aluminum.

The filler slurry is obtained usually by dispersing filler comprising the aforementioned carbon black, inorganic filler, and the like in a dispersion solvent by using a high speed shearing mixer. As the high speed shearing mixer used for preparation of the slurry, there can be used a high speed shear mixer comprising rotor and stator portions, a high pressure homogenizer, an ultrasonic homogenizer, a colloid mill, and the like.

The particle size distribution of the filler in the slurry is preferably such that a volume average particle size (my) is 25 μm or less and a 90 volume % particle size (D90) is 30 μm or less.

More preferably, the volume average particle size (my) is 20 µm or less, and the 90 volume % particle size (D90) is 25 µm or less. When the particle size is too large, dispersion of the filler in rubber deteriorates and, sometimes, the reinforcing property and abrasion resistance become worse. In addition, a method for measuring the particle size distribution of the filler in the slurry will be described later.

In the slurry, the concentration of the filler is preferably set to 1 to 30% by mass, and especially preferably it is in a range of 2 to 20% by mass. When the concentration of the filler is 1% by mass or more, a volume of the slurry required does not become too large, and when the concentration is 30% by mass or less, the viscosity of the slurry liquid does not become too high, thereby providing the slurry with excellent workability.

In the present invention, when rubber latex is used, the slurry is preferably an aqueous dispersion slurry from a viewpoint of miscibility.

(Production of Wet Masterbatch)

In the present invention, the order of mixing each liquid, when producing a wet masterbatch, is not particularly limited. For example, there is a method where a filler slurry is charged in a stirring vessel equipped with a stirring blade and, while stirring, rubber latex is added thereto, or conversely there is a method where, while stirring the rubber latex, the filler slurry is added thereto. Further, there can be used a method where a filler slurry flow and a rubber latex flow are mixed with a certain flow rate ratio under a condition of vigorous hydraulic stirring.

A coagulated material is formed by coagulating the mixture thus obtained. Coagulation is carried out by a heretofore known method by using a coagulating agent such as, for example, an acid such as formic acid, sulfuric acid, and the like, and a salt such as sodium chloride and the like. Further, the mixture may be subjected to heating, mechanical shear, or furthermore a combination of these. The coagulated material is generally taken out by using a heretofore known solid-liquid separation means, washed thoroughly, and subjected to a drying treatment. The drying treatment can be carried out by using a usual dryer such as a vacuum dryer, an air dryer, a drum dryer, a band dryer, and the like. However, in order to further improve dispersibility of the filler, it is preferable to perform drying while applying a mechanical shear force.

In the thus obtained wet masterbatch, a content of the rubber chemicals relative to 100 parts by mass of a rubber component is usually about 0.2 to 20 parts by mass, and preferably 0.5 to 15 parts by mass. Further, when a filler slurry is used, a content of the filler relative to 100 parts by mass of the rubber component is usually about 20 to 500 parts by mass, and preferably 30 to 80 parts by mass.

The rubber composition of the present invention can be used not only for a tire application but also for applications as industrial products and the like such as vibration absorbing rubber, belts, hoses, and others. Especially, it is suitably used as rubber for tires and can be applied to all kinds of tire members such as, for example, tread rubber, side rubber, ply coating rubber, bead filler rubber, belt coating rubber, and the like.

[Tire]

The tire of the present invention is produced by a usual method by using the rubber composition of the present invention. That is, the rubber composition containing, as described above, the wet rubber masterbatch and, if necessary, various kinds of rubber chemicals is processed into, for example, a tire tread at an unvulcanized stage, and the tire tread is adhered and molded on a tire building machine by a conventional method to form a green tire. This green tire is heated and pressurized in a vulcanizing machine to obtain a tire.

The thus obtained tire of the present invention is excellent in heat aging resistance, a reinforcing property, an elastic modulus, and abrasion resistance.

EXAMPLES

Next, the present invention will be described in more detail with reference to examples, but the present invention is not limited in any way by these examples.

Various measurements in each Example and Comparative Example were performed by the following methods.
1. Physical Properties of Carbon Black
(1) DBP Absorption Value
  This was measured in accordance with JIS K6217-4:2001.
(2) CTAB Adsorption Specific Surface Area
  This was measured in accordance with ISO 6810.
(3) Macrodispersion D
  This was measured by the method described in the text of the Description.
(4) Amount of Acidic Functional Groups
  This was measured by the method described in the text of the Description.
(5) Nitrogen Adsorption Specific Surface Area
  This was measured in accordance with JIS K6217(1997).
2. Evaluation of Filler Slurry
  The particle size distribution [volume average particle size (my) and 90 volume % particle size (D90)] of the filler in the slurry was measured. As a measurement method, there was used laser diffraction scattering type MICROTRAC MT3000 manufactured by NIKKISO CO. LTD.
3. Evaluation of Rubber Composition
(1) Fatigue Resistance (Amount of Tread Decrease in Real Vehicle Test of ORR Tire)
  A tire having a size of 2400R35 was experimentally produced and was mounted on a vehicle and, after driving 50,000 km, groove depth of the tire was measured. A value of (driving distance)/(groove depth before driving−groove depth after driving) was calculated and represented by an index with the value of Comparative Example as 100. The larger the index value, the more excellent the fatigue resistance is.
(2) Abrasion Resistance
  This was evaluated by the Lambourn abrasion test in accordance with JIS K6264:2005. The slip rate was set to 25%.
  In addition, the evaluation results are represented by an index with Comparative Example 10 as a control.
(3) Workability
  This was evaluated by using 6 inch rolls heated to 70° C. under conditions of a clearance of 2 mm and a number of revolutions of 30 rpm in terms of time required for a wet masterbatch material to become a sheet.
Evaluation Criteria:
  A: 400 seconds or less
  B: more than 400 seconds and 600 seconds or less
  C: more than 600 seconds and 800 seconds or less
  D: more than 800 seconds and 1000 seconds or less
  E: more than 1000 seconds and 1200 seconds or less
  F: more than 1200 seconds and 1400 seconds or less.
[Experimental Production of Carbon Black]
  By using a reaction apparatus comprising a combustion gas production zone, a reaction zone, and a reaction termination zone which were arranged continuously, a high temperature combustion gas was produced in the combustion gas production zone, subsequently a raw material was introduced by spraying into the reaction zone, and a reaction gas flow containing carbon black was quenched to terminate the reaction so that a DBP absorption value and a CTAB adsorption specific surface area described in Table A were obtained to produce trial products A to H. Physical properties of each trial product are as shown in Table A and Table 1.

In addition, the DBP absorption value and the CTAB adsorption specific surface area can be regulated by adjusting an amount of oxygen-containing gas introduced in a fuel reaction zone or by adjusting a ratio of an amount of a raw material hydrocarbon fed in a front stage of a raw material introduction zone relative to a total amount of raw material hydrocarbon introduced in the raw material introduction zone.

TABLE 1

Table A

| | | Trial product | | | | | | | |
|---|---|---|---|---|---|---|---|---|---|
| | | A | B | C | D | E | F | G | H |
| Carbon black | DBP absorption value (mL/100 g) | 120 | 100 | 100 | 50 | 120 | 100 | 90 | 55 |
| | CTAB adsorption specific surface area (m²/g) | 240 | 240 | 290 | 240 | 200 | 100 | 200 | 210 |
| | 3.0 × CTAB−270 | 450 | 450 | 600 | 450 | 330 | 30 | 330 | 360 |
| | Average amount of surface acidic functional groups (μeq/m²) | 1.2 | 1.2 | 1.2 | 1.2 | 1.2 | 1.2 | 5 | 5 |

Example 1

(1) Preparation of Filler Slurry

Carbon black ("SBX 45" produced by ASAHI CARBON CO., LTD.) was mixed into water so that the concentration became 10% by mass. Subsequently, an aqueous sodium hydroxide solution having a concentration of 0.1% by mass was added thereto and the mixture was stirred for 90 minutes by using a high shear mixer ("Model EX" manufactured by SILVERSON MACHINES INC.) at a number of revolutions of 40 Hz. Thereafter, the mixture was cooled to room temperature and subsequently stirred for further 90 minutes to obtain a filler slurry.

(2) Production of Wet Masterbatch

In 3 kg of natural rubber latex, 2.7 kg of the filler slurry prepared in the above (1) was mixed while stirring so that a solid content of the filler slurry became 60 parts by mass relative to 100 parts by mass of the natural rubber latex. Thereafter, the pH of the mixture was adjusted to 4.5 by using formic acid to coagulate the mixture. The coagulated material was collected by filtration and washed thoroughly to obtain 900 g of a wet masterbatch.

Example 2

A filler slurry was obtained in the same manner as in Example 1 except that the further stirring after cooling of the mixture to room temperature in preparation of the filler slurry in Example 1 was not performed, and a wet masterbatch was obtained in the same manner as in Example 1.

Example 3

A filler slurry was obtained in the same manner as in Example 2 except that the stirring time using the high shear mixer in Example 2 was changed to 60 minutes, and a wet masterbatch was obtained in the same manner as in Example 1.

Comparative Example 1

A filler slurry was obtained in the same manner as in Example 1 except that a beads mill ("NVM-2" manufactured by AIMEX CO., beads size: 0.3 mm) was used instead of the high shear mixer in Example 1, that the stirring time was changed to 60 minutes, and as the carbon black, "SB WM 09" produced by ASAHI CARBON CO., LTD. was used, and a wet masterbatch was obtained in the same manner as in Example 1.

Comparative Example 2

A filler slurry was obtained in the same manner as in Example 2 except that the stirring time using the high shear mixer in Example 2 was changed to 10 minutes, and a wet masterbatch was obtained in the same manner as in Example 1.

Examples 4 to 6

A filler slurry was obtained in the same manner as in Example 1 except that, as the carbon black in Example 1, "SBX 15" produced by ASAHI CARBON CO., LTD. (Example 4), "WM 02P" produced by ASAHI CARBON CO., LTD. (Example 5), and "SB 805" produced by ASAHI CARBON CO., LTD. (Example 6) were respectively used, and a wet masterbatch was obtained in the same manner as in Example 1.

Examples 7 to 9

A filler slurry was obtained in the same manner as in Example 2 except that, as the carbon black in Example 2, "SBX 15" produced by ASAHI CARBON CO., LTD. (Example 7), "WM 02P" produced by ASAHI CARBON CO., LTD. (Example 8), and "SB 805" produced by ASAHI CARBON CO., LTD. (Example 9) were respectively used, and a wet masterbatch was obtained in the same manner as in Example 2.

Examples 10 to 12

A filler slurry was obtained in the same manner as in Example 3 except that, as the carbon black in Example 3, "SBX 15" produced by ASAHI CARBON CO., LTD. (Example 10), "WM 02P" produced by ASAHI CARBON CO., LTD. (Example 11), and "SB 805" produced by ASAHI CARBON CO., LTD. (Example 12) were respectively used, and a wet masterbatch was obtained in the same manner as in Example 3.

Comparative Examples 3 to 8

A filler slurry was obtained in the same manner as in Comparative Example 1 except that, as the carbon black in Comparative Example 1, "SBX 18" produced by ASAHI CARBON CO., LTD. (Comparative Example 3), "SBX 15" produced by ASAHI CARBON CO., LTD. (Comparative Example 4), "Trial Product G" (Comparative Example 5), "WM 02P" produced by ASAHI CARBON CO., LTD. (Comparative Example 6), "Trial Product H" (Comparative Example 7), and "SB 805" produced by ASAHI CARBON CO., LTD. (Comparative Example 8) were respectively used, and a wet masterbatch was obtained in the same manner as in Comparative Example 1.

Comparative Examples 9 to 12

A filler slurry was obtained in the same manner as in Example 1 except that, as the carbon black in Example 1, "DS 12" produced by ASAHI CARBON CO., LTD. (Comparative Example 9), "Trial Product F" (Comparative Example 10), "SBX 280" produced by ASAHI CARBON CO., LTD. (Comparative Example 11), and "Trial Product E" (Comparative Example 12) were respectively used, and a wet masterbatch was obtained in the same manner as in Example 1.

Comparative Examples 13 to 16

A filler slurry was obtained in the same manner as in Example 1 except that, as the carbon black in Example 1, "Trial Product A" (Comparative Example 13), "Trial Product B" (Comparative Example 14), "Trial Product C" (Comparative Example 15), and "Trial Product D" (Comparative Example 16) were respectively used, and a wet masterbatch was obtained in the same manner as in Example 1.

Comparative Example 17

A filler slurry was obtained in the same manner as in Example 1 except that, as the carbon black in Example 1, "SBX 910" produced by ASAHI CARBON CO., LTD. was used, and a wet masterbatch was obtained in the same manner as in Example 1.

Comparative Examples 18 to 26

A filler slurry was obtained in the same manner as in Example 2 except that, as the carbon black in Example 2, "DS 12" produced by ASAHI CARBON CO., LTD. (Comparative Example 18), "Trial Product F" produced by ASAHI CARBON CO., LTD. (Comparative Example 19), "SBX 280" produced by ASAHI CARBON CO., LTD. (Comparative Example 20), "Trial Product E" (Comparative Example 21), "Trial Product A" (Comparative Example 22), "Trial Product B" (Comparative Example 23), "Trial Product C" (Comparative Example 24), "Trial Product D" (Comparative Example 25), and "SBX 910" produced by ASAHI CARBON CO., LTD. (Comparative Example 26) were respectively used, and a wet masterbatch was obtained in the same manner as in Example 2.

Comparative Examples 27 to 35

A filler slurry was obtained in the same manner as in Example 3 except that, as the carbon black in Example 3, "DS 12" produced by ASAHI CARBON CO., LTD. (Comparative Example 27), "Trial Product F" produced by ASAHI CARBON CO., LTD. (Comparative Example 28), "SBX 280" produced by ASAHI CARBON CO., LTD. (Comparative Example 29), "WM 14K" (Comparative Example 30), "Trial Product A" (Comparative Example 31), "Trial Product B" (Comparative Example 32), "Trial Product C" (Comparative Example 33), "Trial Product D" (Comparative Example 34), and "SBX 910" produced by ASAHI CARBON CO., LTD. (Comparative Example 35) were respectively used, and a wet masterbatch was obtained in the same manner as in Example 3.

TABLE 2

Table 1-1

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Carbon black | DBP absorption value (mL/100 g) | 50 | 50 | 50 | 100 | 90 | 55 | 100 | 90 | 55 | 100 | 90 | 55 |
| | CTAB adsorption specific surface area ($m^2/g$) | 110 | 110 | 110 | 150 | 200 | 210 | 150 | 200 | 210 | 150 | 200 | 210 |
| | 3.0 × CTAB−270 | 60 | 60 | 60 | 180 | 330 | 360 | 180 | 330 | 360 | 180 | 330 | 360 |
| | 3.0 × CTAB−710 | −380 | −380 | −380 | −260 | −110 | −80 | −260 | −110 | −80 | −260 | −110 | −80 |
| | Average amount of surface acidic functional groups ($\mu eq/m^2$) | 1.2 | 1.2 | 1.2 | 1.2 | 1.2 | 1.2 | 1.2 | 1.2 | 1.2 | 1.2 | 1.2 | 1.2 |
| | Type | SBX45 | SBX45 | SBX45 | SBX15 | WMO2P | SB805 | SBX15 | WMO2P | SB805 | SBX15 | WMO2P | SB805 |

TABLE 2-continued

Table 1-1

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Filler slurry | D90 (μm) | 1.05 | 4.77 | 6.79 | 1.15 | 1.54 | 1.62 | 5.13 | 5.33 | 5.48 | 7.31 | 7.56 | 7.68 |
| Rubber composition | Macro-dispersion D (%) | 1.5 | 3.5 | 9 | 1.5 | 1.6 | 1.6 | 3.7 | 3.8 | 4 | 9.2 | 9.5 | 9.9 |
| Result | Fatigue resistance | 170 | 170 | 170 | 100 | 115 | 165 | 100 | 115 | 165 | 100 | 115 | 165 |
| | Abrasion resistance | 110 | 105 | 100 | 115 | 120 | 122 | 110 | 115 | 117 | 105 | 110 | 112 |
| | Workability | A | A | A | A | A | A | A | A | A | A | A | A |

TABLE 3

Table 1-2

| | | Comparative Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Carbon black | DBP absorption value (mL/100 g) | 50 | 50 | 100 | 100 | 90 | 90 | 55 | 55 | 50 | 100 | 120 | 120 |
| | CTAB adsorption specific surface area (m²/g) | 110 | 110 | 150 | 150 | 200 | 200 | 210 | 210 | 90 | 100 | 150 | 200 |
| | 3.0 × CTAB-270 | 60 | 60 | 180 | 180 | 330 | 330 | 360 | 360 | 0 | 30 | 180 | 330 |
| | 3.0 × CTAB-710 | −380 | −380 | −260 | −260 | −110 | −110 | −80 | −80 | −440 | −410 | −260 | −110 |
| | Average amount of surface acidic functional groups (μeq/m²) | 5 | 1.2 | 5 | 1.2 | 5 | 1.2 | 5 | 1.2 | 1.2 | 1.2 | 1.2 | 1.2 |
| | Type | SBWMO9 | SBX45 | SBX18 | SBX15 | Trial product G | WMO2P | Trial product H | SB805 | DS12 | Trial product F | SBX280 | Trial product E |
| Filler slurry | D90 (μm) | 0.2 | 18 | 0.2 | 19.2 | 0.2 | 20.3 | 0.2 | 21.5 | 0.98 | 1.1 | 1.12 | 1.48 |
| Rubber composition | Macro-dispersion D (%) | 0.7 | 11 | 0.7 | 11.5 | 0.7 | 12.1 | 0.7 | 12.7 | 1.4 | 1.5 | 1.5 | 1.6 |
| Result | Fatigue resistance | 175 | 160 | 105 | 90 | 120 | 105 | 170 | 155 | 170 | 100 | 80 | 80 |
| | Abrasion resistance | 120 | 85 | 125 | 90 | 130 | 95 | 132 | 97 | 90 | 100 | 115 | 120 |
| | Workability | E | A | D | A | E | A | F | A | A | C | A | A |

TABLE 4

Table 1-3

| | | Comparative Example | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 |
| Carbon black | DBP absorption value (mL/100 g) | 120 | 100 | 100 | 50 | 50 | 50 | 100 | 120 | 120 | 120 | 100 | 100 |
| | CTAB adsorption specific surface area (m²/g) | 240 | 240 | 290 | 240 | 290 | 90 | 100 | 150 | 200 | 240 | 240 | 290 |
| | 3.0 × CTAB-270 | 450 | 450 | 600 | 450 | 600 | 0 | 30 | 180 | 330 | 450 | 450 | 600 |

TABLE 4-continued

Table 1-3

| | | Comparative Example | | | | | | | | | | | |
|---|---|---|---|---|---|---|---|---|---|---|---|---|
| | | 13 | 14 | 15 | 16 | 17 | 18 | 19 | 20 | 21 | 22 | 23 | 24 |
| | 3.0 × CTAB-710 | 10 | 10 | 160 | 10 | 160 | −440 | −410 | −260 | −110 | 10 | 10 | 160 |
| | Average amount of surface acidic functional groups (μeq/m²) | 1.2 | 1.2 | 1.2 | 1.2 | 1.2 | 1.2 | 1.2 | 1.2 | 1.2 | 1.2 | 1.2 | 1.2 |
| | Type | Trial product A | Trial product B | Trial product C | Trial product D | SBX910 | DS12 | Trial product F | SBX280 | Trial product E | Trial product A | Trial product B | Trial product C |
| Filler slurry | D90 (μm) | 1.63 | 1.59 | 1.67 | 1.66 | 1.7 | 4.7 | 4.8 | 4.9 | 5.2 | 5.3 | 5.3 | 5.4 |
| Rubber composition | Macro-dispersion D (%) | 1.6 | 1.6 | 1.6 | 1.6 | 1.7 | 3.5 | 3.5 | 3.5 | 3.6 | 3.7 | 3.7 | 3.7 |
| Result | Fatigue resistance | 80 | 100 | 100 | 170 | 170 | 170 | 100 | 80 | 80 | 80 | 100 | 100 |
| | Abrasion resistance | 125 | 125 | 130 | 125 | 130 | 85 | 95 | 110 | 115 | 120 | 120 | 125 |
| | Workability | B | B | D | B | E | A | C | A | A | B | B | D |

TABLE 5

Table 1-4

| | | Comparative Example | | | | | | | | | | |
|---|---|---|---|---|---|---|---|---|---|---|---|---|
| | | 25 | 26 | 27 | 28 | 29 | 30 | 31 | 32 | 33 | 34 | 35 |
| Carbon black | DBP absorption value (mL/100 g) | 50 | 50 | 50 | 100 | 120 | 120 | 120 | 100 | 100 | 50 | 50 |
| | CTAB adsorption specific surface area (m²/g) | 240 | 290 | 90 | 100 | 150 | 200 | 240 | 240 | 290 | 240 | 290 |
| | 3.0 × CTAB-270 | 450 | 600 | 0 | 30 | 180 | 330 | 450 | 450 | 600 | 450 | 600 |
| | 3.0 × CTAB-710 | 10 | 160 | −440 | −410 | −260 | −110 | 10 | 10 | 160 | 10 | 160 |
| | Average amount of surface acidic functional groups (μeq/m²) | 1.2 | 1.2 | 1.2 | 1.2 | 1.2 | 1.2 | 1.2 | 1.2 | 1.2 | 1.2 | 1.2 |
| | Type | Trial product D | SBX910 | DS12 | Trial product F | SBX280 | WM14K | Trial product A | Trial product B | Trial product C | Trial product D | SBX910 |
| Filler slurry | D90 (μm) | 5.3 | 5.4 | 6.9 | 6.9 | 7 | 7.3 | 7.5 | 7.5 | 7.6 | 7.6 | 7.6 |
| Rubber composition | Macrodispersion D (%) | 3.7 | 3.8 | 8.9 | 9.1 | 9.1 | 9.2 | 9.3 | 9.2 | 9.3 | 9.3 | 9.4 |
| Result | Fatigue resistance | 170 | 170 | 170 | 100 | 80 | 80 | 80 | 100 | 100 | 170 | 170 |
| | Abrasion resistance | 120 | 125 | 80 | 90 | 105 | 110 | 115 | 115 | 120 | 115 | 120 |
| | Workability | B | E | A | C | A | A | B | B | D | B | E |

INDUSTRIAL APPLICABILITY

According to the present invention, there is obtained a rubber composition (elastomer mixture) having high performance and excellent processability such as roll workability and the like. The rubber composition of the present invention can be used not only for a tire application but also for applications as industrial products and the like such as vibration absorbing rubber, belts, hoses, and others.

The rubber composition of the present invention is especially suitably used as rubber for tires and can be applied to all kinds of tire members such as, for example, tread rubber, side rubber, ply coating rubber, bead filler rubber, belt coating rubber, and the like. The tire of the present invention is excellent in heat aging resistance, a reinforcing property, an elastic modulus, abrasion resistance, and the like.

The invention claimed is:

1. A rubber composition obtained by mixing 30 to 80 parts by mass of carbon black, whose DBP absorption value and CTAB adsorption specific surface area satisfy the following relational formulas (I) to (III), into 100 parts by mass of a rubber component, wherein macrodispersion D(%) of carbon black in the rubber composition is 1% or more and less than 10%:

$$DBP \text{ absorption value}(cm^3/100\ g) < 3.0 \times (CTAB \text{ adsorption specific surface area } (m^2/g))-270 \quad (I);$$

$$DBP \text{ absorption value}(cm^3/100\ g) < 115 \quad (II); \text{ and}$$

$$110 \leq CTAB \text{ adsorption specific surface area}(m^2/g) < 230 \quad (III); \text{ and}$$

wherein an average amount of surface acidic functional groups of the carbon black satisfies a relational formula represented by the following formula (IV):

$$0.15 \leq \text{average amount of surface acidic functional groups } (\mu eq/m^2) < 3.00 \quad \text{(IV)}.$$

2. The rubber composition according to claim 1, wherein the DBP absorption value and the CTAB adsorption specific surface area of the carbon black satisfy the following relational formulas (I') and (II'):

$$3.0 \times (CTAB \text{ adsorption specific surface area}(m^2/g)) - 710 < DBP \text{ absorption value } (cm^3/100 \text{ g}) < 3.0 \times (CTAB \text{ adsorption specific surface area}(m^2/g)) - 270 \quad \text{(I'); and}$$

$$40 < DBP \text{ absorption value}(cm^3/100 \text{ g}) < 115 \quad \text{(II')}.$$

3. The rubber composition according to claim 1, wherein the macrodispersion D(%) is 1% or more and less than 8%.

4. The rubber composition according to claim 1, comprising a wet masterbatch produced by drying a mixture which is obtained by mixing filler slurry, formed by dispersing the carbon black in water, and rubber latex in a liquid phase.

5. A tire obtained by using the rubber composition according to claim 1, wherein the rubber composition is processed into a tire tread at an unvulcanized stage, the tire tread is adhered and molded on a tire building machine to form a green tire, and the green tire is heated and pressurized in a vulcanizing machine to obtain a tire.

* * * * *